United States Patent
Gorek

(10) Patent No.: US 8,049,508 B2
(45) Date of Patent: Nov. 1, 2011

(54) METHOD AND APPARATUS FOR DETERMINING FORMATION BOUNDARY NEAR THE BIT FOR CONDUCTIVE MUD

(75) Inventor: Matthias Gorek, Lower Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 546 days.

(21) Appl. No.: 12/179,237

(22) Filed: Jul. 24, 2008

(65) Prior Publication Data

US 2008/0297161 A1 Dec. 4, 2008

Related U.S. Application Data

(63) Continuation-in-part of application No. 11/687,470, filed on Mar. 16, 2007, now Pat. No. 7,554,329.

(51) Int. Cl.
*G01V 3/20* (2006.01)
*G01V 3/26* (2006.01)

(52) U.S. Cl. .................... 324/342; 324/338

(58) Field of Classification Search ............ 324/332, 324/333, 334, 337, 338, 339, 342, 344, 345, 324/356

See application file for complete search history.

(56) References Cited

U.S. PATENT DOCUMENTS

| | | | |
|---|---|---|---|
| 3,014,177 A | 12/1961 | Hungerford et al. | |
| 3,408,561 A | 10/1968 | Redwine et al. | |
| 3,808,520 A | 4/1974 | Runge | |
| 4,416,494 A | 11/1983 | Watkins et al. | |
| 4,536,713 A | 8/1985 | Davis et al. | |
| 4,578,675 A | 3/1986 | MacLeod | |
| 4,792,802 A | 12/1988 | Meadows | |
| 5,081,419 A | 1/1992 | Meador et al. | |
| 5,235,285 A | 8/1993 | Clark et al. | |
| 5,278,550 A | 1/1994 | Rhein-Knudsen et al. | |
| 5,339,036 A | 8/1994 | Clark et al. | |
| 5,339,037 A | 8/1994 | Bonner et al. | |
| 5,359,324 A | 10/1994 | Clark et al. | |
| 5,720,356 A | 2/1998 | Gardes | |
| 6,181,138 B1 | 1/2001 | Hagiwara et al. | |
| 6,297,639 B1 | 10/2001 | Clark et al. | |
| 6,359,438 B1 | 3/2002 | Bittar | |
| 6,373,253 B1 | 4/2002 | Lee | |
| 6,384,605 B1 | 5/2002 | Li | |
| 6,641,434 B2 | 11/2003 | Boyle et al. | |
| 7,019,528 B2 | 3/2006 | Bittar | |
| 7,073,378 B2 | 7/2006 | Smits et al. | |
| 7,755,361 B2* | 7/2010 | Seydoux et al. ............... | 324/333 |
| 2003/0229449 A1 | 12/2003 | Merchant et al. | |
| 2004/0027131 A1* | 2/2004 | Bittar ............................ | 324/338 |
| 2005/0140373 A1* | 6/2005 | Li et al. ........................ | 324/338 |
| 2007/0119243 A1 | 5/2007 | Smits et al. | |
| 2007/0236222 A1 | 10/2007 | Gorek et al. | |

OTHER PUBLICATIONS

Bonner et al.; "Measurements at the Bit:: A New Generation of MWD Tools", Oilfield Review, (date unknown) pp. 44-54.

* cited by examiner

*Primary Examiner* — Kenneth J Whittington
(74) *Attorney, Agent, or Firm* — Mossman, Kumar & Tyler, P.C.

(57) ABSTRACT

A method and apparatus for determining a parameter of interest of an earth formation during drilling of a borehole. A first toroidal coil antenna induces a current along a path that includes a bottomhole assembly and the formation. A second toroidal coil antenna disposed at the drillbit and oriented at a non-zero angle to the longitudinal axis of the bottomhole assembly measures an electrical signal resulting from the current, the electrical signal being a parameter of interest of the formations.

17 Claims, 8 Drawing Sheets

METHOD AND APPARATUS FOR DETERMINING FORMATION BOUNDARY NEAR THE BIT FOR CONDUCTIVE MUD

CROSS-REFERENCES TO RELATED APPLICATIONS

This application claims priority as a continuation-in-part of U.S. patent application Ser. No. 11/687,470 filed on Mar. 16, 2007, with a priority claim to U.S. patent application Ser. No. 60/790,363 filed on Apr. 7, 2006.

BACKGROUND OF THE DISCLOSURE

1. Field of the Disclosure

This disclosure generally relates to exploration for hydrocarbons involving electrical investigations of a borehole penetrating an earth formation. More specifically, this disclosure relates to tilted toroidal coil near the drillbit conveyed in the borehole for introducing and measuring individual survey currents injected into the wall of the borehole.

2. Background of the Art

Electrical earth borehole logging is well known and various devices and various techniques have been described for this purpose. Broadly speaking, there are two categories of devices used in electrical logging devices. In the first category, called "galvanic" devices, electrodes emit current into the earth formations in order to determine resistivity. One of the simplest forms of galvanic devices is the so-called "normal" device where a current electrode emits a current through the earth formation to a remote return location, and a voltage electrode measures the potential due to that current with respect to the remote reference location. In the second category, inductive measuring tools, an antenna within the measuring instrument induces a current flow within the earth formation. Resistivity can be determined by measuring either the magnitude or the attenuation caused by propagation of this current by means of the same antenna or separate receiver antennas. Various illustrative embodiments of the present disclosure belong to the first category, galvanic devices, as described in more detail below.

Normal type devices have been used extensively in the logging industry to determine formation resistivity when the borehole fluid is either more resistive or is slightly less resistive than the formation. One of the earlier devices was that of Doll wherein a so-called "micronormal" tool was used for measuring resistivity near the borehole wall.

Some galvanic devices are designed to focus the survey current into the formation whose resistivity is to be determined. For example, Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Other galvanic devices focus the current near the borehole wall. This is useful when the mud resistivity is much lower than the formation resistivity.

U.S. Pat. No. 6,050,068 to Chemali et al., having the same assignee as the present disclosure, the contents of which are incorporated herein by reference, teaches an apparatus for making measurements of the resistivity of an earth formation during the drilling process. A drill bit is conveyed on a bottom assembly for the purpose of drilling the borehole. At least one measure electrode is carried on an exterior surface of the drillbit and is used to convey a measure current into the formation. A device set in a cavity of the drillbit is responsive to at least one of (i) the current, and, (ii) the voltage of the at least one measure electrode. The response of this device indicates a measurement of resistivity of the formation near the borehole. A source of voltage coupled to the at least one electrode provides a specified voltage to the at least one electrode. The device disclosed in Chemali is an unfocused device. Consequently, there may be variations in the measured resistivity due to changes in standoff of the electrode during rotation of the tool. It may be desirable to reduce the effect of the standoff. Those versed in the art and having benefit of the present disclosure would recognize that standoff at the bit may be caused by bouncing of the bit during drilling.

In many drilling applications it is necessary to stop the drilling process before or shortly after the bit penetrates a new formation. In order to determine the position for stopping, the drilling industry uses resistivity tools which are sensitive at or near the bit. Typically, these tools use a toroidal coil for transmitting a current along the drillstring and a receiver toroidal coil for measuring the current near the bit in direction of the borehole.

The Bit Resistivity Tool offers a service which is known as "geostopping," in which the BHA stops before a specific formation (e.g. reservoir) is penetrated. Geostopping can be useful when a casing has to be placed directly at the beginning of a reservoir, or when the bit has to be exchanged because the new formation is expected to be harder, etc. Therefore, it is important to offer a sensor which is able to measure resistivity values at the bit or ahead of the bit.

A transmitting toroidal coil antenna disposed on an electrically conductive metal body, such as a drill collar on a drill string, has been used in the past. The transmitting antenna is energized to induce a current which travels in a path that includes the body and the formations. An electrode is disposed on the body, and an electrical signal resulting from said current is measured at the electrode to obtain an indication of the resistivity of the formations.

These tools provide a best response if the new formation is penetrated perpendicularly. In this case, there will be a very quick response curve with a very steep slope. If a high inclination of the BHA to the formation is present, the response deteriorates; the curve slope is flat and it is not easy to determine the point of penetration. Unfortunately penetrations in which there is a very small angle between borehole and formation are more frequent in present drilling practices. Therefore, there is a need to recognize the beginning penetration of a new formation in situations where the angle between borehole and formation border is very small. The following invention addresses this need.

SUMMARY OF THE DISCLOSURE

One embodiment of the disclosure is an apparatus for determining a resistivity parameter of an earth formation during drilling of a borehole therein. The apparatus includes a drillbit configured to be conveyed on a bottomhole assembly (BHA) configured to drill the borehole; a first toroidal antenna disposed on the BHA and oriented along a longitudinal axis of the BHA; a current source configured to energize the first toroidal antenna to induce a current which travels in a path that includes the BHA and the formation; a second toroidal antenna disposed near the drillbit and oriented at a non-zero angle to the longitudinal axis of the BHA; a device configured to measure at the second toroidal antenna an electrical signal resulting from the current, the electrical signal being indicative of the resistivity parameter; and at least one processor configured to estimate a value of the resistivity parameter using the electrical signal.

Another embodiment of the disclosure is a method of determining a resistivity parameter of an earth formation during drilling of a borehole. The method includes conveying a drillbit configured to drill the borehole on a bottomhole assembly (BHA); energizing a first toroidal antenna disposed on the BHA and oriented along a longitudinal axis of the BHA to induce a current which travels in a path that includes the BHA and the formation; measuring at a second toroidal antenna disposed near the drillbit and oriented at a non-zero angle to the longitudinal axis of the BHA an electrical signal resulting from the current, the electrical signal being indicative of the resistivity parameter; and estimating a value of the resistivity parameter using the electrical signal.

Another embodiment of the disclosure is a computer-readable medium accessible to a processor, the computer-readable medium including instructions which enable the processor to estimate a value of a resistivity parameter of an earth formation surrounding a borehole using a signal provided by a first antenna in the borehole in response to a current induced in the earth formation by a second antenna, wherein an axis of the first antenna is inclined relative to a longitudinal axis of the borehole.

BRIEF DESCRIPTION OF THE FIGURES

The present disclosure is best understood with reference to the following figures in which like numerals refer to like elements.

DETAILED DESCRIPTION OF THE DISCLOSURE

Figure 1:
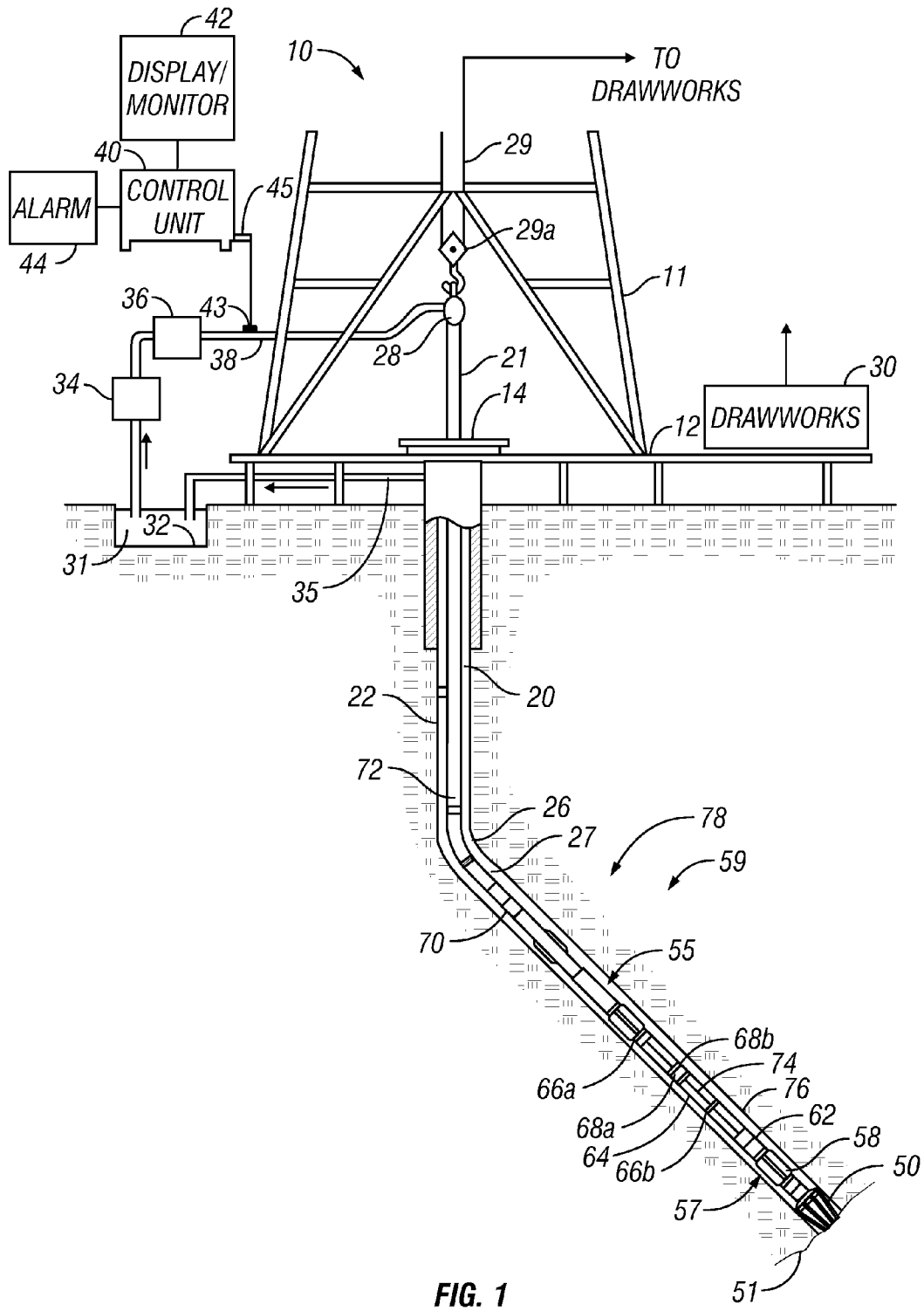
FIG. 1 is a schematic illustration of a drilling system that includes a resistivity logging tool according to various illustrative embodiments of the present disclosure.

FIG. 1 shows a schematic diagram of a drilling system 10 having a downhole assembly containing a sensor system and the surface devices according to one embodiment of present disclosure. As shown, the system 10 includes a conventional derrick 11 erected on a derrick floor 12 that supports a rotary table 14 that is rotated by a prime mover (not shown) at a desired rotational speed. A drillstring 20 that includes a drill pipe section 22 extends downward from the rotary table 14 into a borehole 26. A drill bit 50 attached to the drillstring 20 downhole end disintegrates the geological formations when it is rotated. The drillstring 20 is coupled to a drawworks 30 via a kelly joint 21, swivel 28 and line 29 through a system of pulleys 29a. During the drilling operations, the drawworks 30 is operated to control the weight on bit and the rate of penetration of the drillstring 20 into the borehole 26. The operation of the drawworks 30 is well known in the art and is thus not described in detail herein.

During drilling operations a suitable drilling fluid (commonly referred to in the art as "mud") 31 from a mud pit 32 is circulated under pressure through the drillstring 20 by a mud pump 34. The drilling fluid 31 passes from the mud pump 34 into the drillstring 20 via a desurger 36, fluid line 38 and the kelly joint 21. The drilling fluid 31 is discharged at the borehole bottom 51 through an opening in the drill bit 50. The drilling fluid 31 circulates uphole through the annular space 27 between the drillstring 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit 40. The surface control unit 40 displays desired drilling parameters and other information on a display/monitor 42 which information is utilized by an operator to control the drilling operations. The surface control unit 40 contains a computer, memory for storing data, data recorder(s) and/or other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur. Those versed in the art would recognize that if a mud motor is used, there is relative rotation between the drillbit and the drillstring and provision has to be made for transfer of signals between the drillbit and the drillstring. This transfer may be made using electromagnetic telemetry.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit 50, the downthrust of the drill motor 55, and the reactive upward loading from the applied weight on bit. A stabilizer 58 coupled to the bearing assembly 57 acts as a centralizer for the lowermost portion of the mud motor 55 assembly.

In one embodiment of the system, the downhole subassembly 59 (also referred to as the bottomhole assembly or "BHA"), which contains the various sensors and MWD devices to provide information about the formation and downhole drilling parameters and the mud motor 55, is coupled between the drill bit 50 and the drill pipe 22. The downhole assembly 59 preferably is modular in construction, in that the various devices are interconnected sections so that the individual sections may be replaced when desired. It may be necessary to assemble the cable for the bit electrode (discussed below) in all the other devices between the bit and the return electrode (also discussed below).

Still referring back to FIG. 1, the BHA 59 may also contain sensors and devices in addition to the above-described sensors. Such devices include a device 64 for measuring the formation resistivity near and/or in front of the drill bit 50, a gamma ray device 76 for measuring the formation gamma ray intensity, and devices, such as an inclinometer 74, for determining the inclination and/or the azimuth of the drillstring 20. The formation resistivity measuring device 64 is preferably coupled above the lower kick-off subassembly 62 that provides signals, from which the resistivity of the formation near or in front of the drill bit 50 is determined. A dual propagation resistivity device ("DPR") having one or more pairs of transmitting antennae 66a and 66b spaced from one or more pairs of receiving antennae 68a and 68b is used. Magnetic dipoles are employed that operate in the medium-frequency spectrum and the lower high-frequency spectrum. In operation, the transmitted electromagnetic waves are perturbed as they propagate through the formation surrounding the resistivity measuring device 64. The receiving antennae 68a and 68b detect the perturbed waves. Formation resistivity is derived from the phase and amplitude of the detected signals. The detected signals are processed by a downhole circuit and/or processor that is preferably placed in a housing 70 above the mud motor 55 and transmitted to the surface control unit 40 using a suitable telemetry system 72.

The inclinometer 74 and the gamma ray device 76 are suitably placed along the resistivity measuring device 64 for respectively determining the inclination of the portion of the drillstring 20 near the drill bit 50 and the formation gamma ray intensity. Any suitable inclinometer and gamma ray device, however, may be utilized for the purposes of various illustrative embodiments of the present disclosure. In addition, an orientation device (not shown), such as a magnetometer, an accelerometer, or a gyroscopic device, may be utilized to determine the drillstring 20 azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drillbit 50. In an alternate embodiment of the drillstring 20, the mud motor 55 may be coupled below resistivity measuring device 64 or at any other suitable place.

The drillstring 20 contains a modular sensor assembly, such as the formation resistivity measuring device 64, a motor assembly, such as the mud motor 55 assembly, and one or more kick-off subs, such as the lower kick-off subassembly 62, for example. In one embodiment, the sensor assembly includes a resistivity device, as described in more detail below, the gamma ray device 76, and the inclinometer 74.

The bottomhole assembly (BHA) 59 of the present disclosure includes a MWD section 78 that may include a nuclear formation porosity measuring device, a nuclear density device, and an acoustic sensor system placed above the mud motor 55 in the housing for the MWD section 78 for providing information useful for evaluating and testing subsurface formations along the borehole 26. The present disclosure may utilize any of the known formation density devices. Any prior art density device using a gamma ray source may be used. In use, gamma rays emitted from the source enter the formation where they interact with the formation and attenuate. The attenuation of the gamma rays is measured by a suitable detector from which density of the formation is determined.

The above-noted devices transmit data to the downhole telemetry system 72, which in turn transmits the received data uphole to the surface control unit 40. The downhole telemetry system 72 also receives signals and data from the uphole control unit 40 and transmits such received signals and data to the appropriate downhole devices. The present disclosure may use a mud pulse telemetry technique to communicate data from downhole sensors and devices during drilling operations. A transducer 43 placed in the mud supply line 38 detects the mud pulses responsive to the data transmitted by the downhole telemetry system 72. The transducer 43 generates electrical signals in response to the mud pressure variations and transmits such signals via a conductor 45 to the surface control unit 40. Other telemetry techniques such as electromagnetic and acoustic techniques and/or any other suitable technique may be utilized for the purposes of this disclosure. The drilling assembly also includes a directional sensor. Without limiting the scope of the disclosure, the directional sensor can be a magnetometer of the inertial type. The assembly includes a novel sensor described below.

Figure 2:
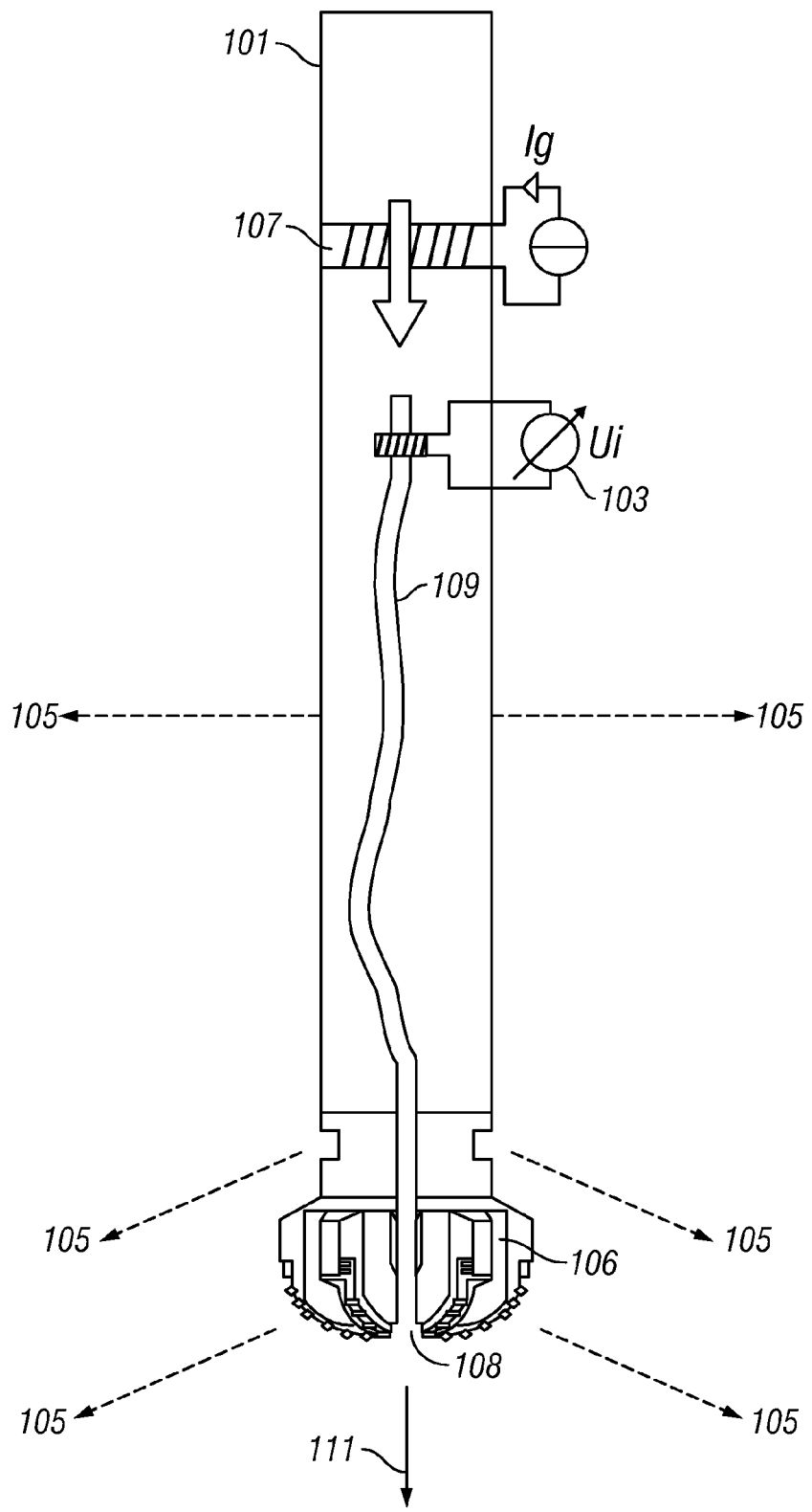
FIG. 2 (prior art) is an illustration of one embodiment of a device in which a measure current ahead of the bit is focused using the drillbit.

The principle of the prior art method of U.S. patent application Ser. No. 11/687,470 of Gorek et al. is illustrated in FIG. 2. At a suitable location on the drillstring 20, a voltage source 107 is provided. In the example, the voltage source 107 is shown to be on and/or in a drill collar 101 and is part of the BHA 59. This is not to be construed as a limitation to the present disclosure. The voltage may be generated, for example, by using a toroidal coil mounted somewhere on and/or around the drillstring 20. This voltage source 107 generates a current in an axial direction in the drillstring 20 that flows in the direction of the drill bit 106 and returns on the opposite side of the voltage source 107 at a remote location. If the mud is conductive, the drill collar may act as the return. An electrical connection is provided between the voltage source 107 and bit 106 through the drill collar 101. For the purposes of the present disclosure, the voltage source 107 is also a power source since it generates a current in the drillstring 20. Inside the drillbit 106, an electrode 108 is installed at the bit face. The electrode 108 is isolated from the rest of the BHA 59 and connected through a cable 109 to a current measurement device 103 such as a toroidal coil mounted tightly around the cable 109, or around a measurement resistor (not shown) in series with the cable 109. If a resistor is used, a voltage meter could be used to determine the current. The route taken by the cable 109 from the current measurement device 103 to the electrode 108 may be arbitrary, but the cable 109 should be isolated, such as by suitable electrical insulation, from the drill collar 101. On the other end of the cable 109 from the electrode 108, the current measurement device 103 is connected to electronic circuitry located in the drill collar 101 of the BHA 59. With this arrangement, the absolute potential of the drillbit 106 (and the adjacent portion of the drill collar 101) is about the same as the absolute potential of the electrode 108. This maintains a focusing condition for the current conveyed by the electrode 108, as discussed next.

With the configuration shown, the drillbit 106 and the adjacent portion of the drill collar 101 act as a focusing electrode that conveys a focusing current 105 in the direction generally indicated as shown in FIG. 2. It should be noted that the term "convey" is to be used in its broadest meaning and is intended to include current both into and out of the formation. As a result of the focusing provided by the focusing current 105, a measure current 111 from the electrode 108 is generally directed ahead of the drillbit 106. It is this forward direction of the measure current 111 that provides the ability of the present disclosure to see ahead of the drillbit.

An apparent resistance $R_{app}$ of the earth formation is then given by $$R_{app} = \frac{U}{I}, \quad (1)$$

where U is the voltage of the voltage source 107 and I is the measure current 111, for example, measured at the current measurement device 103. An apparent resistivity of the earth formation is obtained as:

$$\rho = k\frac{U}{I},\quad(2)$$

where k is a calibration factor. The calibration factor may be obtained, for example, by laboratory measurements made with the tool in a medium of known resistivity or by modeling. The true resistivity is obtained from the apparent resistivity by applying a mud correction.

Figure 3:
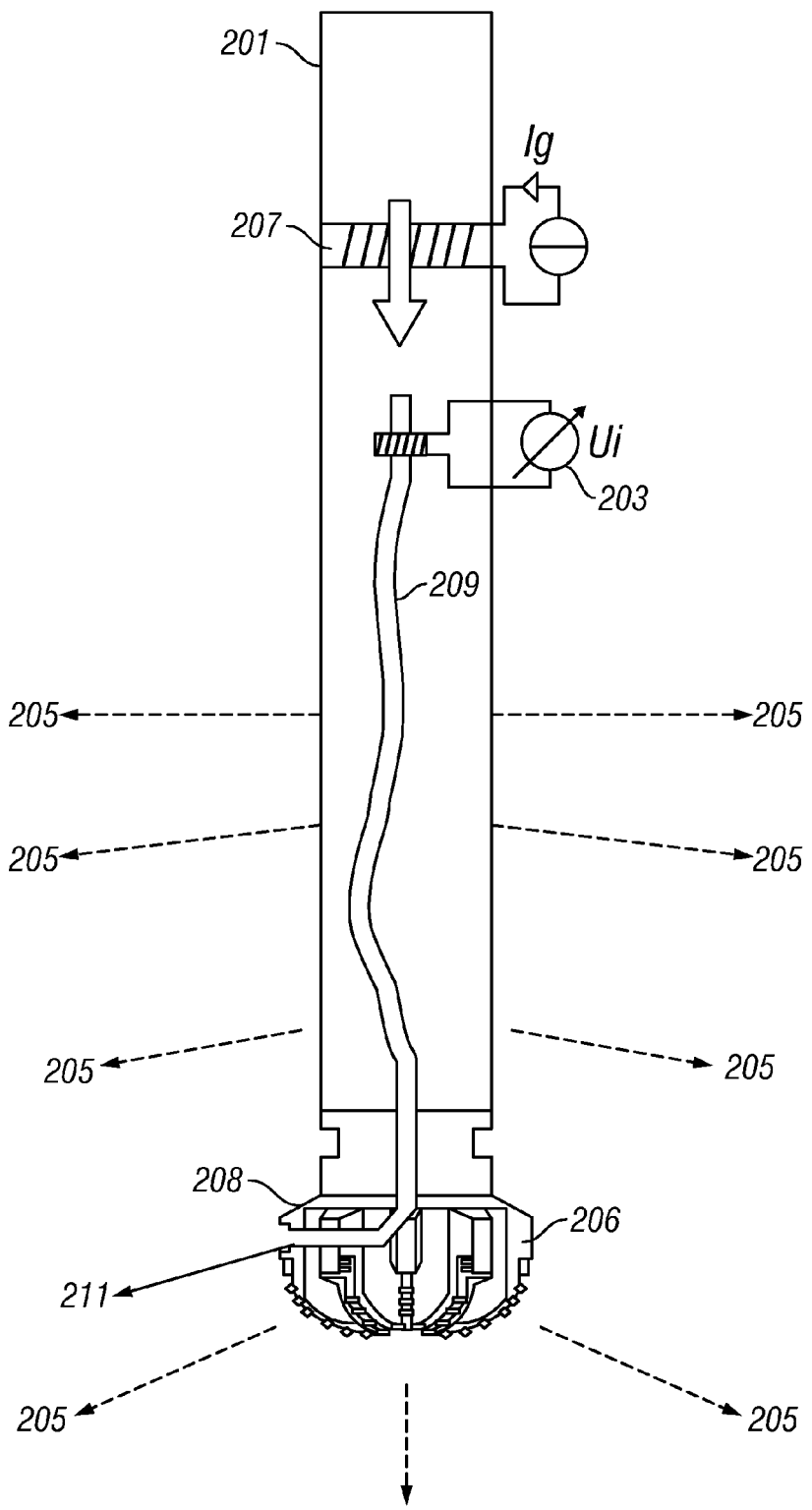
FIG. 3 (prior art) is an illustration of an azimuthally sensitive implementation of the device of FIG. 2 in which a measure current is focused using the drillbit.

Another embodiment of the Gorek disclosure is illustrated in FIG. 3. As in the embodiment of FIG. 2, an axial voltage source 207 is provided. In the example, the voltage source 207 is shown to be on and/or in the drill collar 201 and is part of the BHA 59. This is not to be construed as a limitation to the present disclosure. The voltage may be generated, for example, by using a toroidal coil around the drillstring 20. This voltage source 207 generates a current in an axial direction of the drillstring 20 that flows in the direction of the drillbit 206 and returns on the opposite side of the voltage source 207 at a remote location (see above). An electrical connection is provided between the voltage source 207 and bit 206 through the drill collar 203. Inside the drillbit 206, an electrode 208 is installed at a side of the drillbit 206. This is in contrast to the embodiment of FIG. 2 where the electrode 108 is at the bit face. The electrode 208 is isolated from the rest of the BHA 59 and connected through a cable 209 to a current measurement device 203 such as a toroidal coil mounted tightly around the cable 209, or around a measurement resistor (not shown) in series with the cable 209. The route taken by the cable 209 from the current measurement device 203 to the electrode 208 may be arbitrary, but the cable 209 should be isolated, such as by suitable electrical insulation, from the drill collar 201. On the other end of the cable 209 from the electrode 208, the current measurement device 203 is connected to electronic circuitry located in the drill collar 201 of the BHA 59.

The focusing current of the drillbit 206 and an adjacent portion of the drill collar 201 is indicated by 205. Due to the fact that the electrode 208 is on the side of the drillbit 206, the measure current 211 flows in a direction that is close to being radial. This direction of the measure current 211 provides the logging tool with azimuthal sensitivity.

As would be known to those first in the art, resistivity measurements made by an MWD device provide a better indication of formation resistivity (or, equivalently, conductivity) than wireline measurements. This is due to the fact that wireline measurements, which are made after an elapsed time from the drilling of the well, are affected by invasion of the formation by drilling fluids. In this regard, resistivity measurements made at the drill bit are even better.

Figure 4:
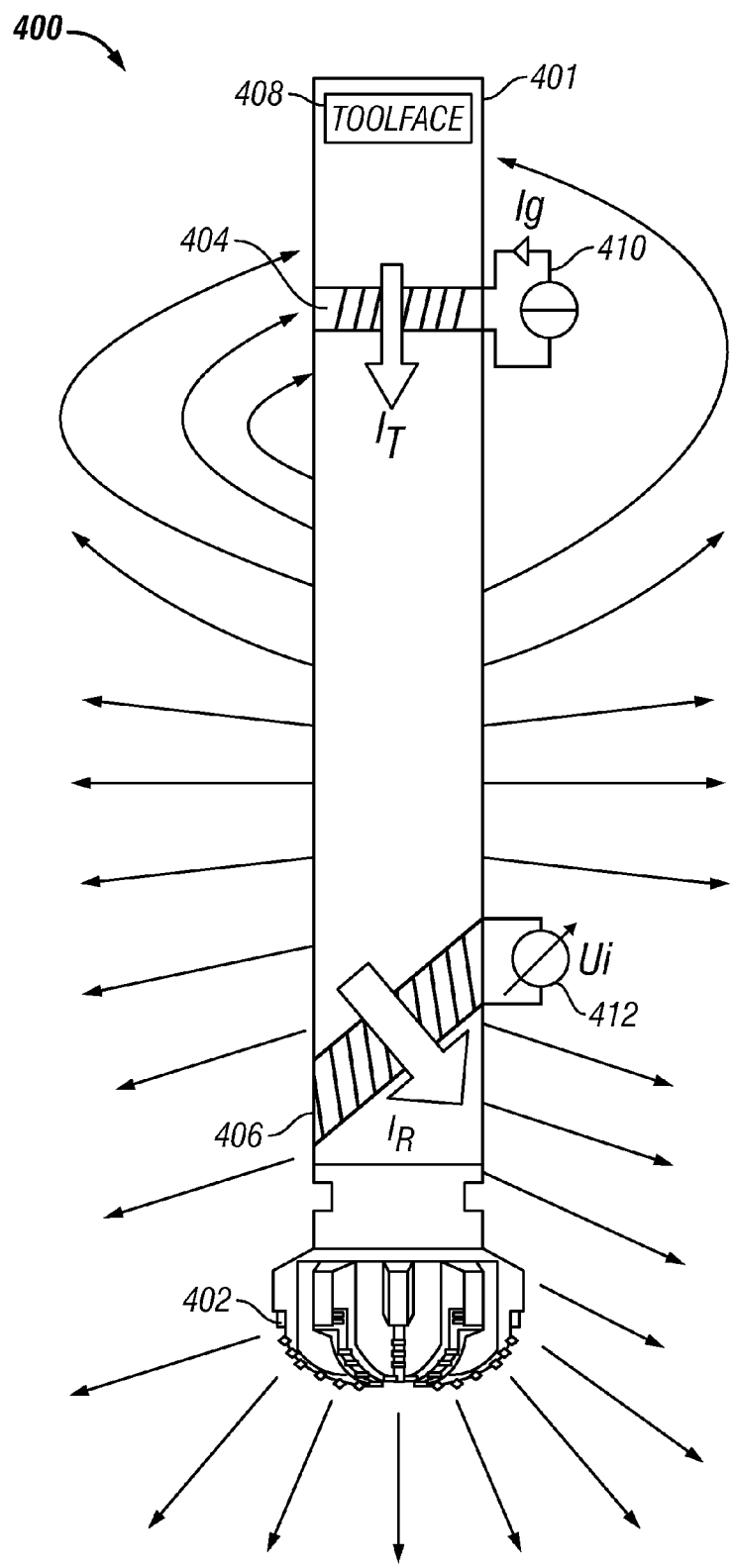
FIG. 4 shows an embodiment of a drill bit assembly having a toroidal coil measurement system for obtaining formation measurements.

FIG. 4 shows an embodiment of a drill bit assembly 400 having a toroidal coil measurement system for obtaining formation measurements. The drill bit assembly includes a drill string 401 having a drill bit 402 at one end. The assembly also includes a first toroidal coil (transmitter) 404 distally displaced from the drill bit and oriented parallel to the longitudinal axis of the drill string and a second toroidal coil (receiver) 406 disposed near the drill bit and oriented at a nonzero angle to the longitudinal axis of the drill string. A current source 410 is attached to the transmitter coil. A measurement device, such as a current measurement device 412, is attached to the receiver coil. In one aspect, the toroidal coil transmitter 404 induces a current along the drillstring 401 into the surrounding formation. This current travels into the formation, and the induced current is measured at toroidal coil receiver 406. Because the receiver 406 is oriented at an angle to the longitudinal axis of the drill string, it is sensitive to azimuthal differences in resistivity, such as may occur at a dipped formation boundary. This azimuthal sensitivity may thus be used to identify a location at which the drill bit penetrates such a boundary. Those versed in the art and having the benefit of the present disclosure would recognize that the toroidal coil 406 provides measurements similar to the azimuthal measurements provided by the current electrode 211 of FIG. 3.

Since the azimuthally-sensitive apparatus is rotated during drilling, an image may be generated by incorporating azimuthal measurements with a toolface measurement device. Similar to how conventional images are used to identify formation dips, the image produced by the present apparatus may be used to determine formation penetration information for "geostopping" for highly dipped formations. Since an image is mainly qualitative information, the precision required for determining a measurement is not high. The present disclosure therefore tolerates small differences in a coil's permeability.

Figure 5:
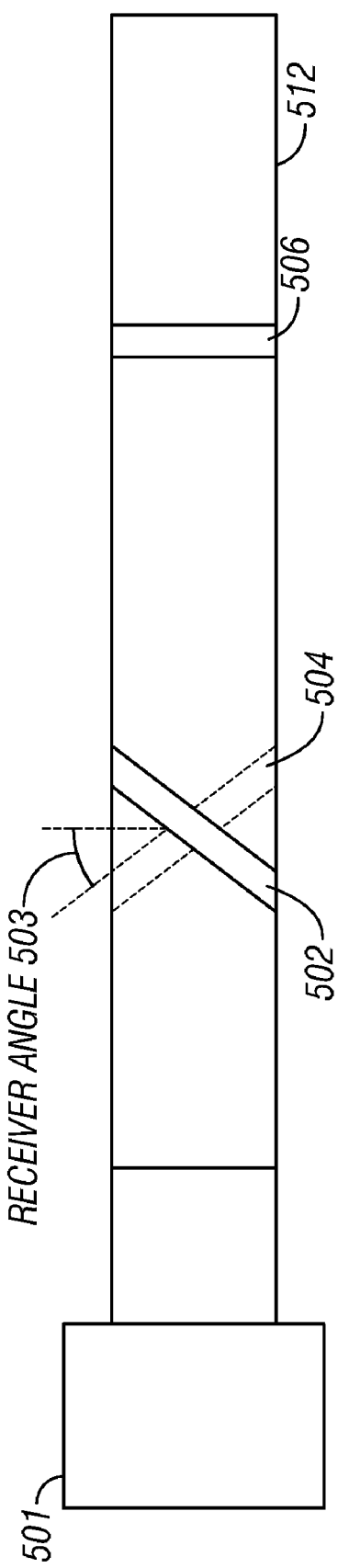
FIG. 5 illustrates a sketch of the present disclosure for examining the effects of angular deviation of a receiver on obtained measurement values.

FIG. 5 illustrates a model of the device of FIG. 4 for examining the effects of angular deviation of a receiver on obtained measurement values. The model includes a drill bit 501 at one end of a drill string 510. The drill bit is appended to the drill string at a bit connection 503. A transmitter toroid 506 is disposed on the drill string away from the drill bit and a receiver toroid is disposed near the drill bit. In the illustrative embodiment of FIG. 5, the center of the receiver toroid is located 600 mm away from the bit connection along the drill string, and the center of the transmitter toroid is 1100 mm along the drill string from the bit connection. A current return section 512 is present on the drill string. The axis of the transmitter is substantially parallel to the longitudinal axis of the drill string. The angle of the receiver toroid can be varied. The angle of the receiver can be also reversed to obtain measurements at 180° opposite directions. Toolface position 502 indicates a 0° position of the receiver. Toolface position 504 indicates a 180° position of the receiver. These positions describe two extreme positions in a borehole during rotation.

Figure 6:
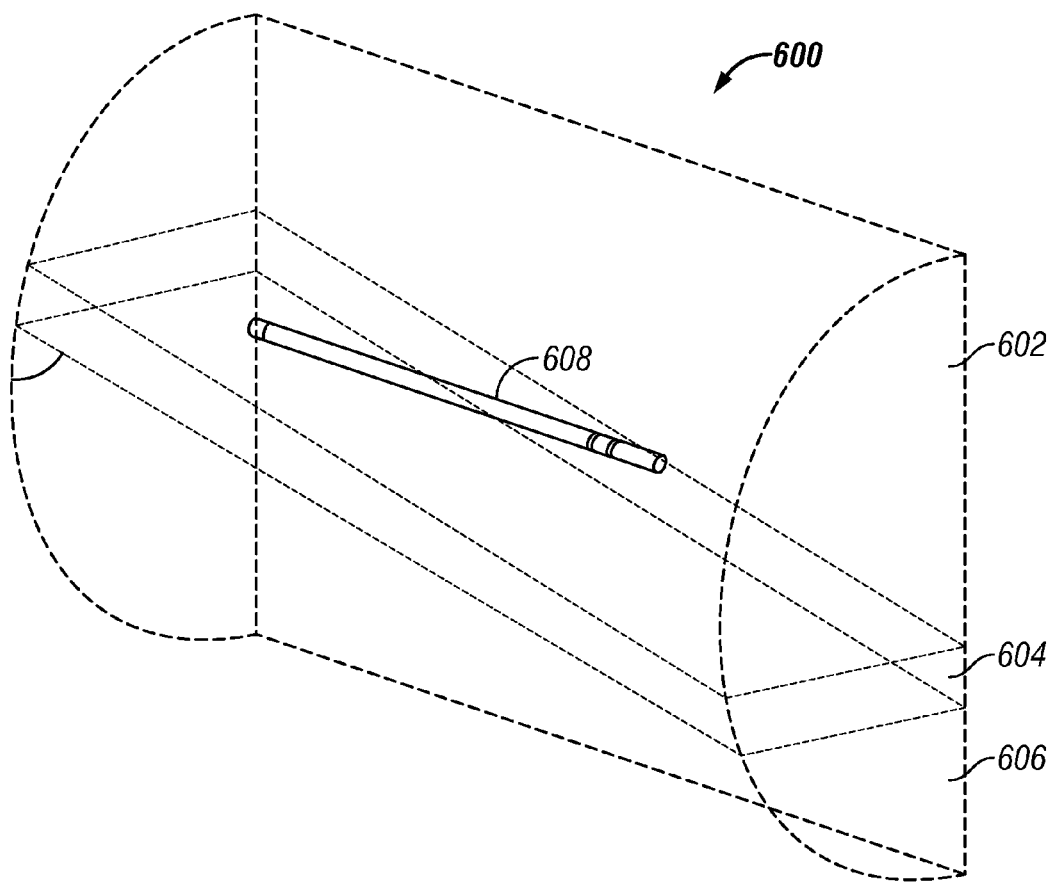
FIG. 6 shows a model from which resistivity responses are obtained.

FIG. 6 shows a model from which resistivity responses are obtained. The model includes three formations: two formations of low resistivity (602 and 606) and a formation of high resistivity 604 in between them. The low-resistivity formations (602 and 606) have a resistivity of 1 Ω-m. The high-resistivity formation 604 has a resistivity of 100 Ω-m. Drill string 608 penetrates the formations and is shifted along a borehole axis. The dip angle of this formation can be varied during simulation. A High-Side and a Low-Side of the model is indicated in the figure. On the drill string 500 of FIG. 5, the High-Side is measured when the receiver toroid is oriented at a 0° toolface angle and the Low-Side is measured when the receiver is oriented at 180° toolface angle. The 100 Ω-m formation is oriented so that the drill string penetrates it from below (from the Low Side). For the purpose of the present disclosure, only a penetration of the interface is observed. Thus, in an alternate embodiment, the bed thickness of the reservoir may be set to infinity for all simulations, and only a two layer model is used. The center of the bit face as it penetrates into the new formation is assigned a depth of 0 m. Negative values for the depth indicate the distance to the boundary before the penetration and positive values indicate distance measured after penetration. For the illustrated embodiment, different formation dip angles are modeled: 30°, 45°, 60°, and 75°. For each of these dip angles the receiver angles are varied in the following order: 0°, 30°, 45°, 60°, and 75°. For non-zero receiver angles, both the High-Side and Low-Side responses for the receiver are simulated.

It should be noted that High- and low-side are defined as gravity toolface and point therefore only up and down. If the formation dip is pointing from west to east and the BHA is approaching the interface from north east or north west, the maximum difference won't be found from high- to low-side. The image would indicate this situation by a shifted sinusoid curve; not showing the magnitude at high- or low-side. Generally it would be better to use the whole image for geostopping and/or geosteering purpose, which needs a full circumferential toolface measurement.

FIGS. 7A-D show simulation results obtained at four formation dip angles: 30°, 45°, 60°, and 75°, respectively. Each graph of FIGS. 7A-D displays apparent resistivity over depth at various rotational angles of the receiver. The interface between the first and second formations is indicated as 0 m on the graphs, and this corresponds to the point where the bit penetrates the second formation boundary. Negative values along the y-axis mark positions of the bit before penetration; positive values mark positions of the bit after penetration.

All curves obtained from receivers tilted at non-zero angles from the longitudinal axis display two clearly separated curves for High-Side and for Low-Side measurements. The High-Side and Low-Side curves tend to separate once the formation boundary is penetrated. The separation distance of these curves, which is determined at a point of 50% of signal change, depends on the receiver angle as well as on the formation dip angle. In general, if the receiver coil points to the High-Side, the resistivity response upon penetrating the formation boundary is affected more readily than those responses obtained from Low-Side receiver coil orientations as well as responses obtained for an axially oriented receiver.

The exception to this occurs for measurements obtained at a receiver angle of 75° when the formation dip angle is 30° and 45°. For an angle of 75°, the receiver extends significantly along the drill string in the borehole direction. The resulting smaller space between receiver and transmitter is not sufficient to produce a guarding effect between transmitter and receiver. This can be observed in the 75° curves not reaching the maximum value after penetration. The insufficient guarding can be remedied by increasing the space between the transmitter coil and the receiver coil.

Figure 7A:
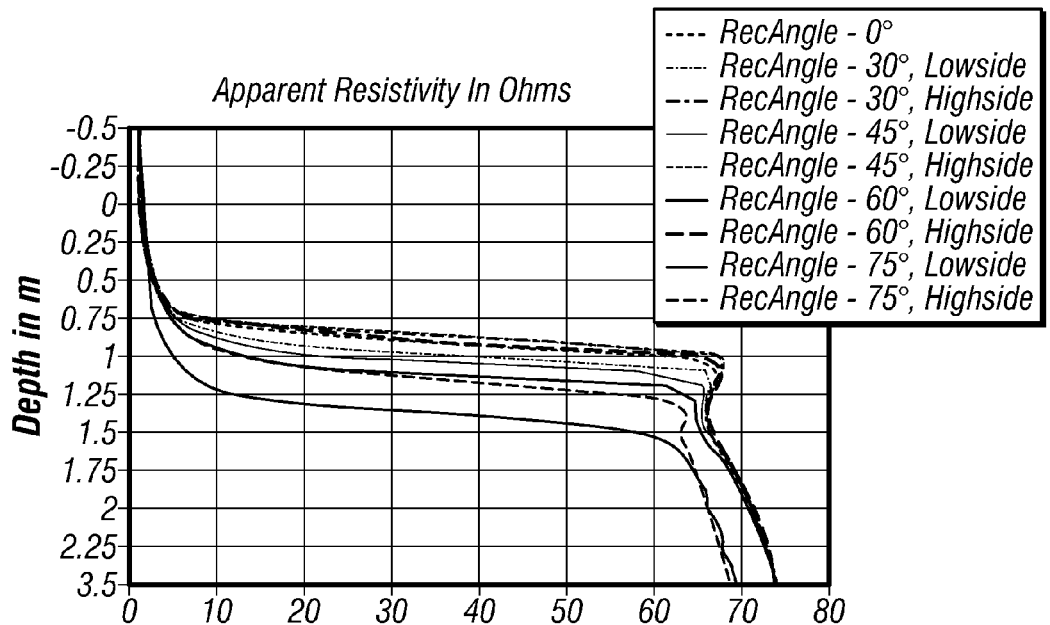
FIGS. 7A-D show simulation results obtained at four formation dip angles: 30°, 45°, 60°, and 75°, respectively.
Figure 7B:
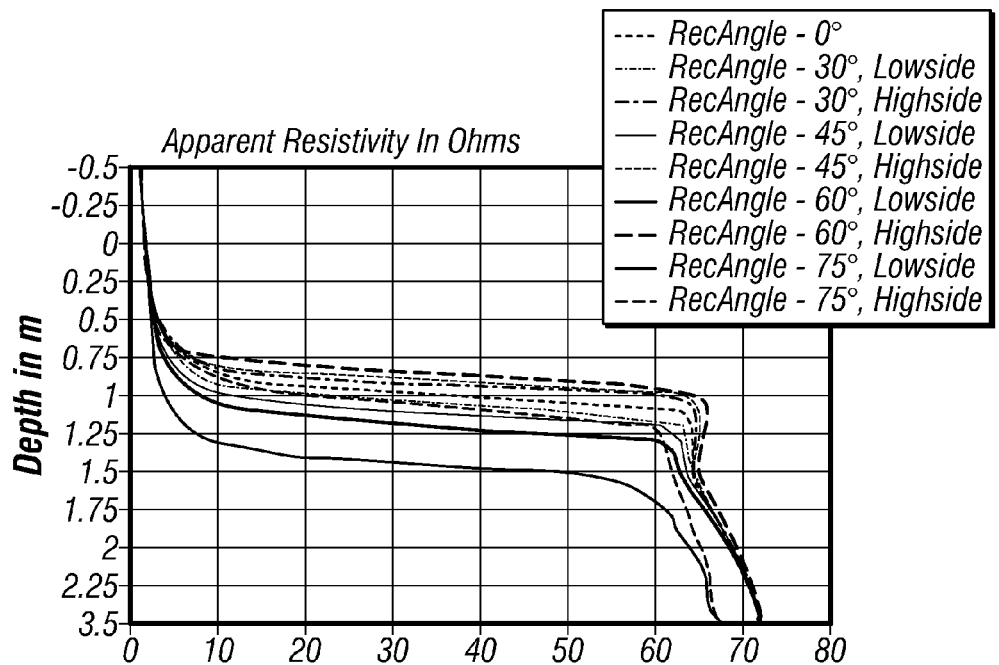
Figure 7C:
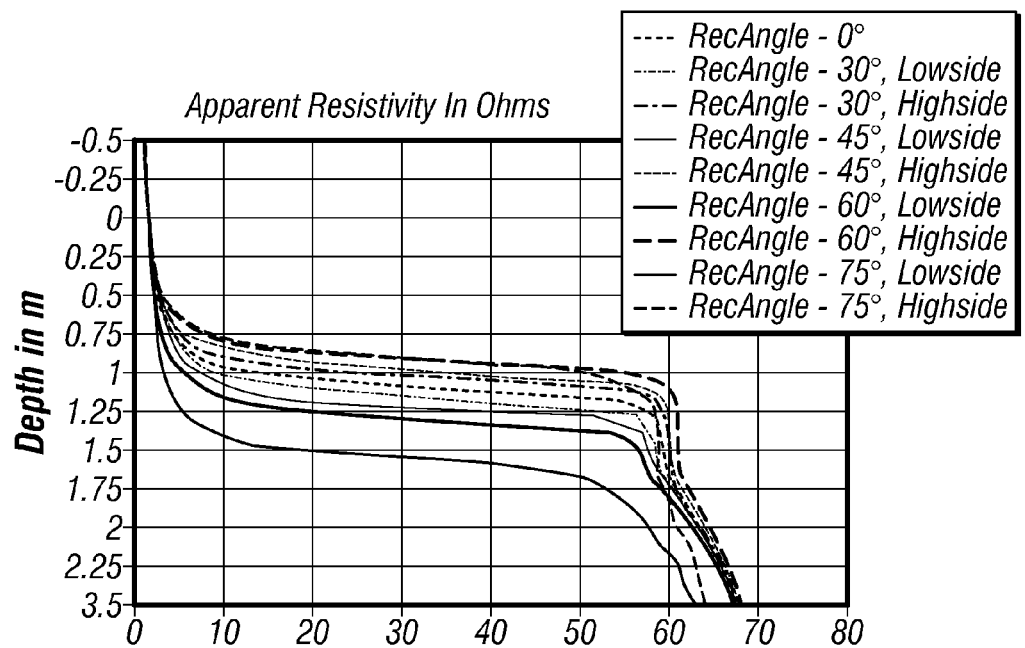
Figure 7D:
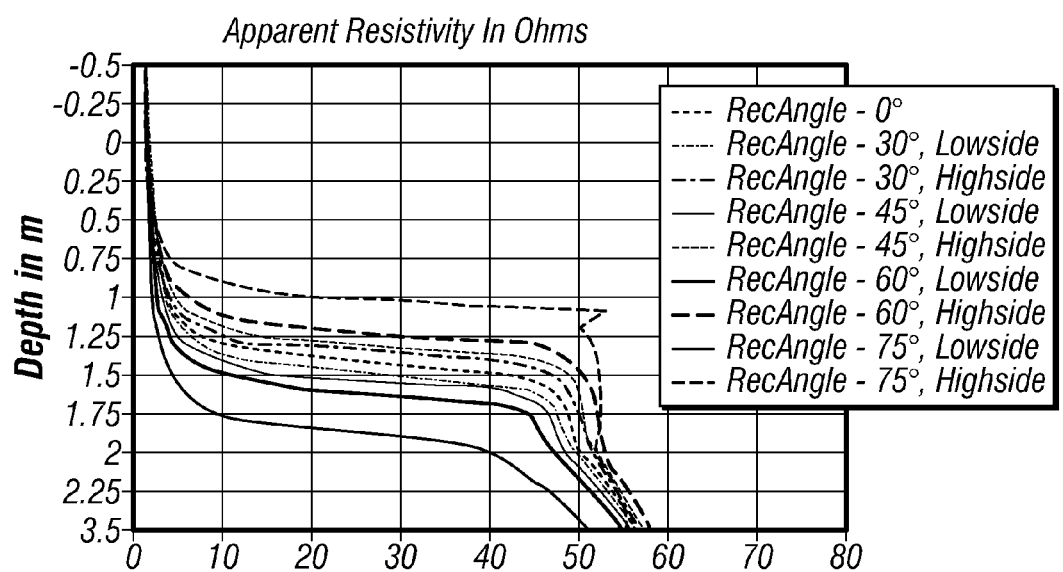

FIG. 7A shows a graph of apparent resistivity for different receiver angles over depth for a formation dip angle of 30°. FIG. 7B illustrates apparent resistivity for different receiver angles over depth for a formation dip angle of 45°. FIG. 7C illustrates apparent resistivity for different receiver angles over depth for a formation dip angle of 60°. FIG. 7D illustrates apparent resistivity for different receiver angles over depth for a formation dip angle of 75°. The formation boundary is penetrated by the bit at 0m. For non-zero receiver angles, both the response for Low-Side and High-Side are shown separately.

Observing the High-Side and Low-Side curves, for a receiver angle of 30° the separation distance is generally small (between 10 cm and 15 cm) and does not change significantly as the formation dip angle changes. The High-Side and Low-Side curves for a receiver angle of 45° displays a slightly larger separation (about 15 cm to 24 cm), and the degree of separation shows a small dependence on formation dip angle, becoming larger with increased formation dip angle. For a 60° receiver angle, the separation varies now from about 24 cm to 37 cm and shows a stronger dependence on the formation dip angle.

The curve for the 0° receiver angle (parallel to the longitudinal axis) appears more or less in the middle between the High-Side and Low-Side curves for a receiver angle of 30° and 45° at all formation dip angles. For a 60° receiver angle, this same condition is only valid for formation dip angles higher than 30°.

As expected, the most noticeable influence to lateral formation differences in resistivity occurs for a receiver oriented at an angle of 75° to the longitudinal axis. The separation distance for Low-Side and High-Side responses for a receiver oriented at 75° depends strongly on the formation dip angle: about 24 cm for 30° dip angle (FIG. 7A), about 37 cm for a 45° dip angle (FIG. 7B), about 62 cm for a 60° dip angle (FIG. 7C), and about 87 cm for a 75° dip angle (FIG. 7D). Also, the relationship between High-Side and Low-Side response curves related to a response curve of an axially-aligned receiver strongly depends on the formation dip angle. The response curve of the axially-aligned receiver is located almost in the middle between High- and Low-Side curves only for a formation dip angle of 75° (FIG. 7D). The toroidal coil at a very high receiver angle can thus be used to determine the dip angle of the formation which is penetrated.

When orientation sensors are used for determining the orientation of the drill bit 50, this orientation information may be combined with resistivity information obtained from the current and voltage measurements to get an estimate of azimuthal variation of resistivity of the earth formation. When layers are inclined to the borehole 26, an azimuthal variation in resistivity (typically as a sinusoidal variation) as measured by the device, such as the logging tool 400 of the present disclosure will result. This sinusoidal variation can be detected using known processing methods out of the noisy "signal." Suitable orientation sensors may be located on the drillstring 20 near the drill bit 50, or on the drive shaft of the drilling motor 55, if one is used. Such orientation sensors should be placed close enough to the drill bit 50 so that the orientation measurements are indicative of the drill bit 50 orientation and are not affected by twisting of the drillstring 20 or the motor 55 drive shaft. The resistivity image may also be used for geosteering by comparing an image obtained from the measurements with a modeled image derived from a subsurface model.

The measurements made downhole may be recorded on a suitable medium. A data may also be compressed and transmitted to a surface location. In the embodiment of the disclosure illustrated in FIG. 3, a method of data compression disclosed in U.S. Pat. No. 7,200,492 to Hassan et al. having the same assignee as the present disclosure and the contents of which are incorporated herein by reference, may be used. The method disclosed in Hassan is for exemplary purposes only and other methods may be used. Hassan discloses a method and apparatus for logging an earth formation and acquiring subsurface information wherein a logging tool is conveyed in borehole to obtain parameters of interest. The parameters of interest obtained may be density, acoustic, magnetic or electrical values as known in the art. The parameters of interest may be transmitted to the surface at a plurality of resolutions using a multi-resolution image compression method. Parameters of interest are formed into a plurality of cost functions from which regions of interest are determined to resolve characteristics of the features of interest within the regions. Feature characteristics may be determined to obtain time or depth positions of bed boundaries and borehole Dip Angle relative to subsurface structures, as well borehole and subsurface structure orientation. Characteristics of the features include time, depth, and geometries of the subsurface such as structural dip, thickness, and lithologies. At the surface, an image of the formation may be constructed. With either of the two embodiments discussed above, a log of resistivity may be produced. In addition, there are several well known uses for resistivity measurements: these include determination of formation hydrocarbon saturation. Knowledge of this saturation is extremely useful in reservoir development.

The processing of the data may be done by a downhole processor to give corrected measurements substantially in real time. Alternatively, the measurements could be recorded downhole, retrieved when the drillstring 20 is tripped, and processed using the surface processor 40. Implicit in the control and processing of the data is the use of a computer program on a suitable machine-readable medium that enables the processor to perform the control and processing. The machine-readable medium may include ROMs, EPROMs, EEPROMs, flash memories and optical disks.

While the foregoing disclosure is directed to the preferred embodiments of the present disclosure, various modifications will be apparent to those skilled in the art. It is intended that all variations within the scope and spirit of the appended claims be embraced by the foregoing disclosure.

What is claimed is:

1. An apparatus configured to determine a resistivity parameter of an earth formation during drilling of a borehole therein, the apparatus comprising:
   a drillbit configured to be conveyed on a bottomhole assembly (BHA);
   a first antenna disposed on the BHA and oriented substantially parallel to a longitudinal axis of the BHA;
   a current source configured to energize the first antenna and induce a current which travels-through the BHA and into the formation;
   a second antenna disposed near the drillbit and oriented at a non-zero angle to the longitudinal axis of the BHA;
   a device configured to measure at the second antenna an electrical signal resulting from the current flowing into the formation, the electrical signal being indicative of the resistivity parameter; and
   at least one processor configured to estimate a value of the resistivity parameter using the electrical signal.

2. The apparatus of claim 1 wherein the resistivity parameter is at least one of (i) a resistivity of the earth formation, (ii) a conductivity of the earth formation, (iii) a distance to an interface in the earth formation, (iv) a resistivity image of the formation, or (v) a thickness of a bed.

3. The apparatus of claim 1 further comprising an orientation sensor configured to determine a toolface angle of the BHA.

4. The apparatus of claim 3, wherein the at least one processor is further configured to select a toolface angle corresponding to a High-Side response and a Low-Side response at the second coil antenna.

5. The apparatus of claim 3 wherein the orientation sensor is selected from the group consisting of (i) an accelerometer, (ii) a magnetometer, or (iii) a gyroscope.

6. The apparatus of claim 1, wherein the at least one processor is further configured to determine a dip angle of a formation.

7. The apparatus of claim 1 wherein the at least one processor is further configured to control a direction of drilling of the BHA based on at least one of: (i) a determined distance to an interface in the earth formation, or (ii) a resistivity image of the formation.

8. A method of determining a resistivity parameter of an earth formation during drilling of a borehole, the method comprising:
   conveying a drillbit on a bottomhole assembly (BHA);
   energizing a first antenna disposed on the BHA and oriented substantially parallel to a longitudinal axis of the BHA to induce a current which travels through the BHA and into the formation;
   measuring at a second antenna disposed near the drillbit and oriented at a non-zero angle to the longitudinal axis of the BHA an electrical signal resulting from the current flowing into the formation, the electrical signal being indicative of the resistivity parameter; and
   estimating a value of the resistivity parameter using the electrical signal.

9. The method of claim 8 wherein the resistivity parameter is at least one of (i) a resistivity of the earth formation, (ii) a conductivity of the earth formation, (iii) a distance to an interface in the earth formation, (iv) a resistivity image of the formation, or (v) a thickness of a bed.

10. The method of claim 8 further comprising determining a toolface angle of the BHA and using the determined toolface angle in determining a resistivity image.

11. The method of claim 10 further comprising selecting a toolface angle corresponding to a High-Side response and a Low-Side response at the second coil antenna.

12. The method of claim 10 wherein determining a toolface angle of the BHA further comprising using an orientation sensor selected from the group consisting of: (i) an accelerometer, (ii) a magnetometer, or (iii) a gyroscope.

13. The method of claim 8 further comprising determining a dip angle of a formation.

14. The method of claim 8 further comprising controlling a direction of drilling of the BHA based on at least one of: (i) a determined distance to an interface in the earth formation, or (ii) a resistivity image of the formation.

15. A non-transitory computer-readable medium product having thereon instructions that when read by a processor cause the processor to execute a method, the method comprising:
   energizing a first antenna disposed on a bottom hole assembly (BHA) in a borehole and inducing a current which travels through the BHA into an earth formation, the first antenna being oriented substantially parallel to a longitudinal axis of the BHA; and
   using a signal provided by a second antenna on the BHA resulting from the current flowing into the formation to estimate a value of a resistivity parameter of the earth formation, the second antenna having an axis inclined to the longitudinal axis of the BHA.

16. The computer-readable medium of claim 15 further comprising at least one of (i) a ROM, (ii) and EPROM, (iii) an EEPROM, (iv) a flash memory, or (v) an optical disk.

17. The computer-readable medium of claim 15 wherein the instructions further enable the processor to further control a direction of drilling of the BHA based on at least one of: (i) a determined distance to an interface in the earth formation, or (ii) a resistivity image of the formation.

* * * * *